(12) United States Patent
Sundhar (10) Patent No.: US 8,850,836 B2
(45) Date of Patent: Oct. 7, 2014

(54) TEMPERATURE CONTROL SYSTEM

(76) Inventor: Shaam P. Sundhar, Princeton, NJ (US)

( * ) Notice: Subject to any disclaimer, the term of this patent is extended or adjusted under 35 U.S.C. 154(b) by 493 days.

(21) Appl. No.: 13/270,492

(22) Filed: Oct. 11, 2011

(65) Prior Publication Data
US 2012/0085830 A1    Apr. 12, 2012

Related U.S. Application Data

(60) Provisional application No. 61/391,994, filed on Oct. 11, 2010.

(51) Int. Cl.
*B60H 1/32* (2006.01)
*B60H 1/00* (2006.01)

(52) U.S. Cl.
CPC .......... *B60H 1/00428* (2013.01); *B60H 1/3222* (2013.01)
USPC ................................. 62/134; 62/236

(58) Field of Classification Search
CPC ............................ B60H 1/3208; B60H 1/3222
USPC ........................ 62/134, 236, 244; 165/44, 271
See application file for complete search history.

(56) References Cited

U.S. PATENT DOCUMENTS

| 6,153,127 A * | 11/2000 | Nakamura et al. ............. 252/588 |
| 2006/0047398 A1* | 3/2006 | Abe et al. ......................... 701/69 |
| 2012/0007364 A1* | 1/2012 | David ............................. 290/54 |

* cited by examiner

*Primary Examiner* — Marc Norman
(74) *Attorney, Agent, or Firm* — QuickPatents; Kevin Prince (57) ABSTRACT

A temperature regulation system for air inside of a vehicle regardless of the on/off state of the vehicle's ignition or engine includes a rechargeable battery for supplying power to an air moving system and a heat exchanger in accordance with demand signals from a thermostat. A motor-generator has a motor mode wherein electrical energy from the battery is converted into rotational kinetic energy and coupled to an AC compressor, and a generator mode wherein rotational kinetic energy from the engine is converted into electrical energy to recharge the battery. A control circuit is electrically connected with the motor-generator and adapted to activate the motor mode when the engine is off and the air temperature inside the vehicle exceeds the desired temperature range, the motor-generator otherwise being in the generator mode. Alternate embodiments includes a motor-compressor that replaces the stock compressor of the vehicle.

10 Claims, 5 Drawing Sheets

TEMPERATURE CONTROL SYSTEM

CROSS-REFERENCE TO RELATED APPLICATIONS

This application claims the benefit of U.S. Provisional Patent Application 61/391,994, filed on Oct. 11, 2010, and incorporated herein by reference.

STATEMENT REGARDING FEDERALLY SPONSORED RESEARCH AND DEVELOPMENT

Not Applicable.

FIELD OF THE INVENTION

This invention relates to environmental heating and cooling systems, and more particularly to an improved such system for a vehicle.

DISCUSSION OF RELATED ART

One of the most unpleasant experiences an automobilist has to endure is to return to his vehicle parked outside on a hot sunny day, and find the temperature inside quite unbearable and suffocating. The same is the case in winter, in which case the temperature dips to the other extreme once the heater is switched off, and vehicle locked.

Some of the methods employed at present to solve the abovementioned issues are to roll down the windows slightly, and using window shields or blinds to decrease exposure of the vehicle to direct sunlight. Currently these methods are used to decrease the interior temperature to some extent but not to a comfortable level, not even to the outside ambient temperature when the weather is hot.

However, the aforementioned attempts are cumbersome to use and inefficient. Attempts like blocking the rays of the sun merely reduce the temperature of the heated air, as opposed to eliminating the heated air from the cabin of the vehicles. Also, the air conditioner can only function if the vehicle's ignition system is in operation. Attempts to keep the temperature inside parked vehicles by insulating the vehicle or using thermoelectric modules is a tested method, but the thermoelectric heating/cooling modules required for such a design are expensive and generally require huge amounts of power for its operation. Therefore, there is a need for a device that can be operated when the ignition system is on or off. Also, there is a need for a temperature regulation system to maintain the temperature of the interior of the vehicle close to ambient so that people entering their vehicle will not experience a furnace-like hot temperature. If the ambient and the interior temperatures are similar, people will not experience any difference. When the ignition is started, the air conditioner need not fight the build up of heat, so the cooler temperature is achieved in a shorter time.

Further, in the conventional vehicle, a study of the optimal usage of air conditioner reveals that a high capacity cooling power is needed only for the first few minutes after the person driving the car enters the vehicle. This is to get rid of the excessive built-up heat in the vehicle and let the interior cool down quickly. Once the temperature inside the cabin drops to a desired comfortable level, less power is needed to maintain it. On the other hand, if the weather is too cold, a separate heating system would be required to warm the passenger cabin of the vehicle. Having a separate heating system and cooling system would be inefficient and more expensive. Thus, there is a need for a temperature regulation system that can maintain a desired temperature range in the vehicle. Also, there is a need for a single system that can maintain a desired temperature range in both hot weather and cold weather conditions.

In the prior art literature, U.S. Pat. No. 4,955,203 issued to Sundhar on Sep. 11, 1990, titled "Air conditioner for parked automotive vehicle," discloses an air conditioning unit. This device discloses for a parked automotive vehicle having a cooling unit comprising a cooling chamber with at least one insulated wall having on opposite sides thereof a heat sink and a cooling block having there between a thermoelectric chip. However, as per the '203 invention, it would require creation of a separate duct system to carry the cold air from trunk to inside the car. Also, in order to implement this design, it is required to drill holes at the metal floor of the trunk for air intake and outflow. Therefore, there is a need for a device that provides the advantage of using the vehicles existing duct system.

Another U.S. Pat. No. 6,453,678 issued to Sundhar on Sep. 24, 2002, titled "Direct current mini air conditioning system," discloses an air conditioning unit which is provided for a parked truck/boat to cool the sleeping cabin. However, the mechanism is not efficient in its operation. Therefore, there is a strong need for a device that operates more efficiently to extend battery usage.

In my previous U.S. patent application Ser. No. 12/471,117, filed on May 22, 2009, I taught a temperature regulation system that includes a motor separate from the engine and adapted to drive the AC compressor of the air moving system of the vehicle. However, such a system, it has been found, requires additional batteries and a separate generator to provide sufficient power for such a separate motor, and often there is insufficient room inside an engine compartment of a vehicle to accommodate these additional components. Thus a system having higher efficiency components and having certain components combined is required in many instances.

From the foregoing, it becomes apparent that there is a need for a system that optimally conditions the air inside the cabin of a parked vehicle, and also during the times when the vehicle is being driven, such that the temperature in the vehicle compartment remains within a desired range. The present invention attempts to bridge the shortcomings in the state of the art literature by proposing an air-conditioning system for vehicles.

Therefore, there is a need for a temperature regulation system that can be operated when the ignition system is on or off. The needed temperature regulation system would maintain comfortable desired temperatures in the vehicle. Further, there is a need for a single system that can maintain comfortable temperatures in both hot weather and cold weather conditions. Also, the needed device would provide the advantage of using the vehicles existing duct and ventilation system. Finally, such a need system would operate more efficiently to extend battery usage. The present invention accomplishes these objectives.

SUMMARY OF THE INVENTION

The present device is a temperature regulation system for a vehicle having an ignition system, an engine, and an air moving system that circulates air inside of the vehicle across a heat exchanger to maintain a desired temperature range within the vehicle with a thermostat. The air moving system includes a compressor for compressing a gas for cooling a portion of the heat exchanger.

The temperature regulation system of the present invention includes a relatively high-power motor-generator for converting between rotational kinetic and electrical energy and having a motor mode wherein electrical energy is converted into rotational kinetic energy and coupled to the compressor. The motor-generator also has a generator mode wherein rotational kinetic energy from the engine is converted into electrical energy.

A rechargeable battery is electrically connected to the motor-generator for supplying power to the motor-generator when in the motor mode, and for receiving electrical energy from the motor-generator when the motor-generator is in the generator mode. Such a rechargeable battery is adapted to electrically power the air moving system of the vehicle when the thermostat detects the temperature of the air inside the vehicle has exceeded the desired temperature range. The heat exchanger is adapted heat the air when the temperature of the air inside the vehicle drops below the desired temperature range, or to cool the air when the temperature of the air in the vehicle rises above the desired temperature range. The rechargeable battery is capable of powering the air moving system of the vehicle when the ignition system is off. The air moving system, when operating, preferably replaces the air inside the vehicle with ambient air outside of the vehicle, in order to cool the average air temperature inside the vehicle, such as by turning off any recirculation functions of the air moving system, for example.

A control circuit is electrically connected with the motor-generator and adapted to activate the motor mode when the engine and the ignition system of the vehicle is off and the air temperature inside the vehicle exceeds the desired temperature range, the motor-generator otherwise being in the generator mode.

The motor-generator, engine and compressor are all mechanically coupled with a first belt and pulley system. The engine further includes an automatic clutch adapted for either disengaging the engine from the first belt and pulley system when the motor-generator is in the motor mode, or for engaging the engine and coupling the engine to the first belt and pulley system when the engine is on and the motor-generator is in the generator mode.

Alternately, the motor-generator is coupled to the compressor with a second belt and pulley system, such that when the engine is on and the motor-generator is in the generator mode, the engine drives the first belt and pulley system to drive the motor-generator and the compressor. Otherwise, when the engine is off and the motor-generator is in the motor mode, the motor-generator drives the second belt and pulley system to drive the compressor. In such an embodiment, the motor-generator and compressor each include the automatic clutch to disengage from the first belt and pulley system when the motor-generator is in the motor mode, and alternately for disengaging from the second belt and pulley system when the motor-generator is in the generator mode.

In a third embodiment, the stock compressor of the vehicle is replaced with a variable displacement compressor-motor. The compressor-motor has a motor portion directly coupled to a compressor portion within an enclosure, such that the motor portion may directly drive the compressor portion regardless of the engine state. The compressor-motor preferably has a low-volume displacement mode that presents less torque to the motor portion than does a high-volume displacement mode for increased cooling capacity. The low-volume displacement mode is used to maintain the temperature of the air inside the vehicle at an ambient air temperature, for example, and the high-volume displacement mode is used when occupants return to the vehicle and desire more substantive cooling, for example.

In such a third embodiment, a stock generator of the vehicle is coupled to the engine and adapted to convert rotational kinetic energy transferred from the engine into electrical energy for recharging of the stock battery and the rechargeable battery. The rechargeable battery is electrically connected to the compressor-motor for supplying power to the motor portion thereof. The control circuit is electrically connected with the compressor-motor and adapted to activate the motor portion when the engine of the vehicle is off and the air temperature inside the vehicle exceeds the desired temperature range.

The present invention is a temperature regulation system that can be operated when the ignition system is on or off. Further, the invention is a system that can maintain desired temperature ranges in both hot weather and cold weather conditions. Also, the system provides the advantage of using the vehicle's existing duct and ventilation system. In addition in hot weather, the fan of the air conditioning can be operated continuously when parked to lower interior temperature by replacing cabin air inside the vehicle with ambient air outside of the vehicle, using less power than the air conditioning system. Finally, the invention allows for efficient cooling of cabin air to ambient temperatures by using a low-volume displacement mode, but can switch to higher capacity cooling in a high-volume displacement mode. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application, and those included herein by reference, as a whole and not to any particular portions of this application. When the claims use the word "or" in reference to a list of two or more items, that word covers all of the following interpretations of the word: any of the items in the list, all of the items in the list and any combination of the items in the list.

Figure 1A:
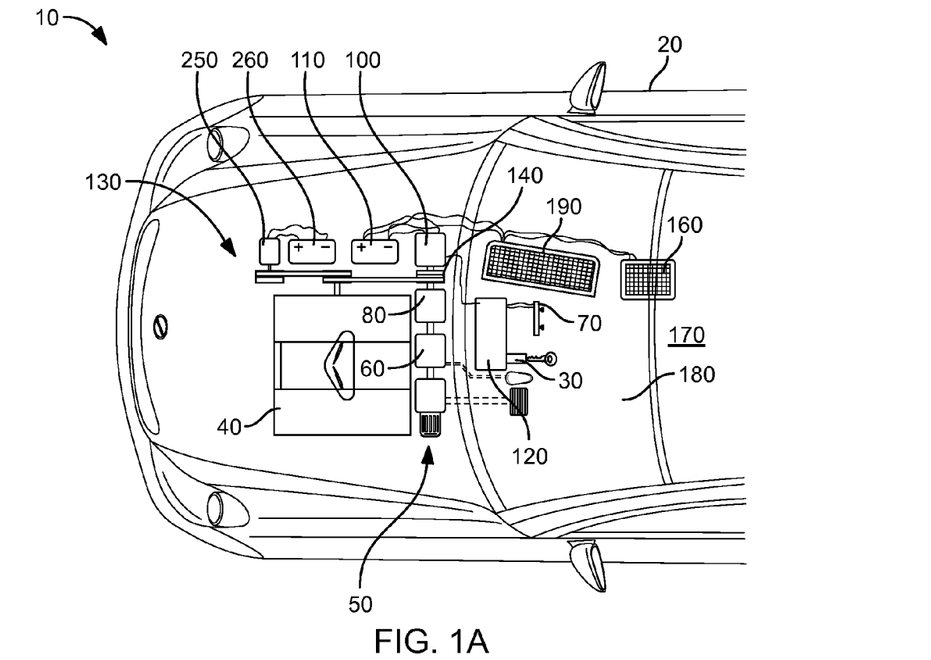
FIG. 1A is a top plan diagram of a first embodiment of a temperature regulation system.
Figure 1B:
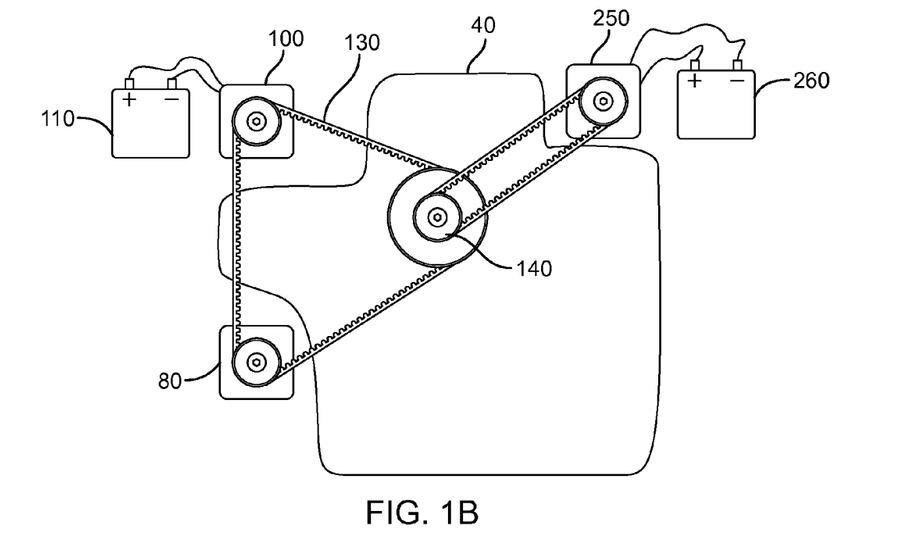
FIG. 1B is an elevational diagram of FIG. 1A.

FIGS. 1A and 1B illustrate a first embodiment of a temperature regulation system 10 for a vehicle 20 having an ignition system 30, an engine 40, and an air moving system 50 that circulates air inside of the vehicle 20 across a heat exchanger 60 to maintain a desired temperature range within the vehicle 20 with a thermostat 70. The air moving system 50 includes a compressor 80 for compressing a gas for cooling a portion of the heat exchanger 60.

The temperature regulation system 10 of the present invention includes a motor-generator 100 for converting between rotational kinetic and electrical energy and having a motor mode wherein electrical energy is converted into rotational kinetic energy and coupled to the compressor 80. The motor-generator 100 also has a generator mode wherein rotational kinetic energy from the engine 40 is converted into electrical energy. Preferably the motor-generator 100 includes aluminum trapezoidal bars as either stator windings, or both stator and rotor windings.

A rechargeable battery 110 is electrically connected to the motor-generator for supplying power to the motor-generator 100 when the motor-generator 100 is in the motor mode, and for receiving electrical energy from the motor-generator 100 when the motor-generator 100 is in the generator mode. Such a rechargeable battery 110 is adapted to electrically power the air moving system 50 of the vehicle 20 when the thermostat 70 detects the temperature of the air inside the vehicle 20 has exceeded the desired temperature range. The heat exchanger 60 is adapted heat the air when the temperature of the air inside the vehicle 20 drops below a desired temperature range, or to cool the air when the temperature of the air in the vehicle 20 rises above the desired temperature range. In the first case, wherein the heat exchanger 60 is heating the air, the motor-generator 100 is in the generator mode since the compressor 80 does not have to be operating. Instead, heating elements (not shown) of the air moving system 50 of the vehicle are activated and powered by the rechargeable battery 110. The rechargeable battery 110 is capable of powering the air moving system 50 of the vehicle 20 when the ignition system 30 is off. The air moving system 50, when operating, preferably replaces the air inside the vehicle 20 with ambient air outside of the vehicle 20, in order to cool the average air temperature inside the vehicle 20.

Such a rechargeable battery 110 may be at least one lithium ion battery, at least one lithium-phosphate battery, at least one lead-acid battery, a combination thereof, or the like, used in conjunction with or separately from a stock battery 260 of the vehicle 20, as required by the energy requirements of the motor-generator 100. In one embodiment, at least one photovoltaic cell 160 (FIG. 1A) is included for recharging the rechargeable battery 110 when exposed to sunlight. Such an at least one photovoltaic cell 160 may be fixed to an outside surface 170 of the vehicle 20, such as a roof portion, or to a heat-reflecting window shield 190 selectively placed in at least one window 180 of the vehicle 20 when the vehicle 20 is left unoccupied, for example.

A control circuit 120 is electrically connected with the motor-generator 100 and adapted to activate the motor mode when the engine 40 and the ignition system 30 of the vehicle 20 is off and the air temperature inside the vehicle 20 exceeds the desired temperature range, the motor-generator 100 otherwise being in the generator mode.

The motor-generator 100, engine 40 and compressor 80 are all mechanically coupled with a first belt and pulley system 130. The engine 40 further includes an automatic clutch 140 adapted for either disengaging the engine 40 from the first belt and pulley system 130 when the motor-generator 100 is in the motor mode, or for engaging the engine 40 and coupling the engine 40 to the first belt and pulley system when the engine 40 is on and the motor-generator 100 is in the generator mode. Such an automatic clutch 140 is known in the art as a clutch pulley, or a friction clutch pulley, for example.

Figure 2A:
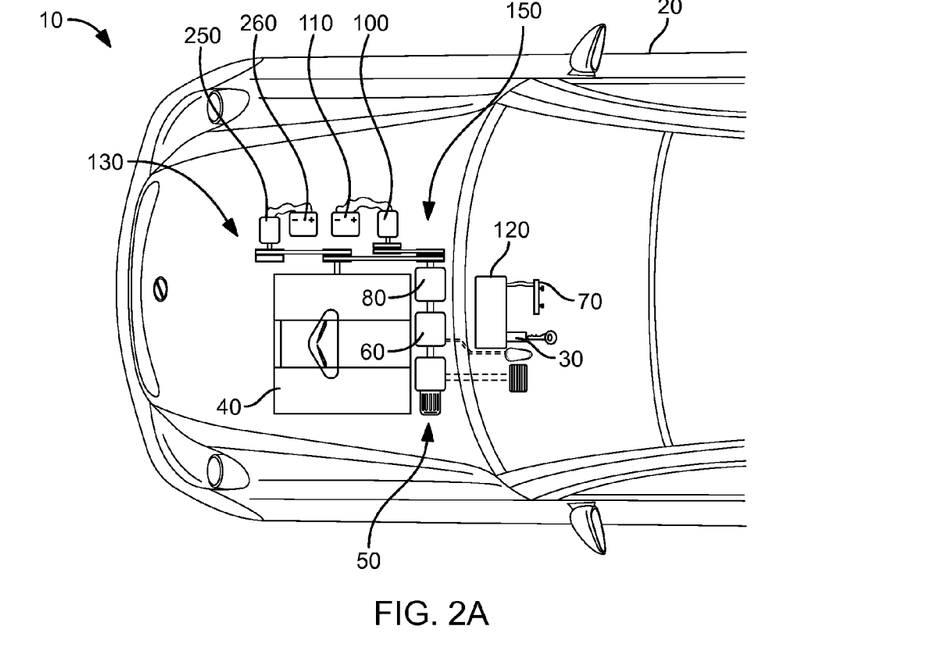
FIG. 2A is a top plan diagram of a second embodiment of a temperature regulation system.
Figure 2B:
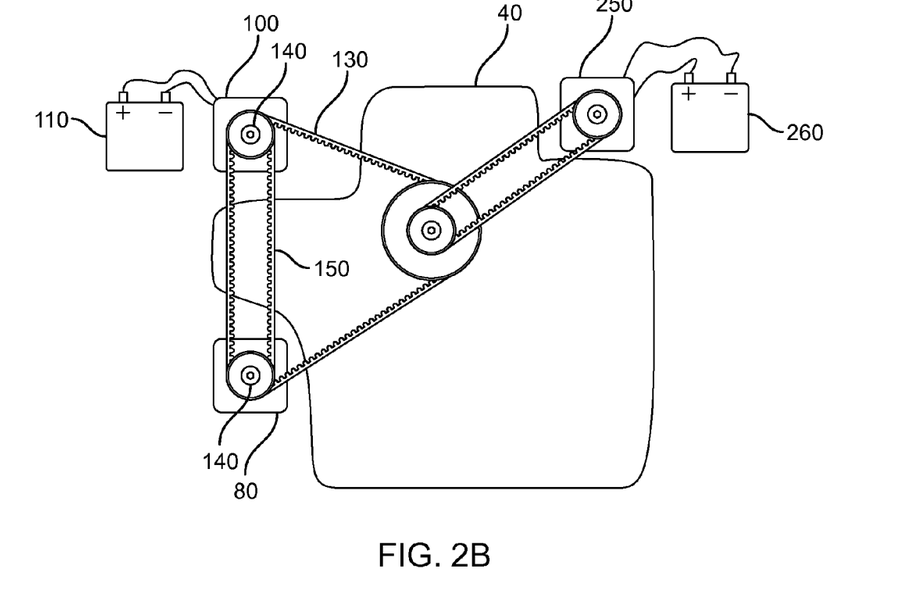
FIG. 2B is an elevational diagram of FIG. 2A.

Alternately, as illustrated in FIGS. 2A and 2B, the motor-generator 100 is coupled to the compressor 80 with a second belt and pulley system 150, such that when the engine 40 is on and the motor-generator 100 is in the generator mode, the engine 40 drives the first belt and pulley system 130 to drive the motor-generator 100 and the compressor 80. Otherwise, when the engine 40 is off and the motor-generator 100 is in the motor mode, the motor-generator 100 drives the second belt and pulley system 150 to drive the compressor 80. In such an embodiment, the motor-generator 100 and compressor 80 each include the automatic clutch 140 to disengage from the first belt and pulley system 130 when the motor-generator 100 is in the motor mode, and alternately for disengaging from the second belt and pulley system 150 when the motor-generator 100 is in the generator mode.

Figure 3A:
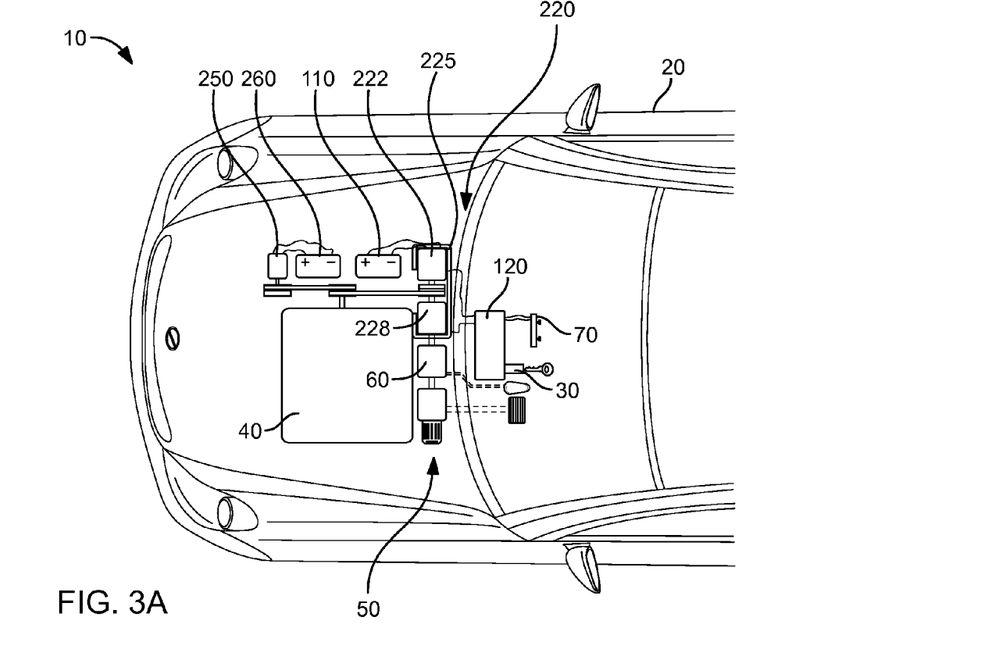
FIG. 3A is a top plan diagram of a third embodiment of a temperature regulation system.
Figure 3B:
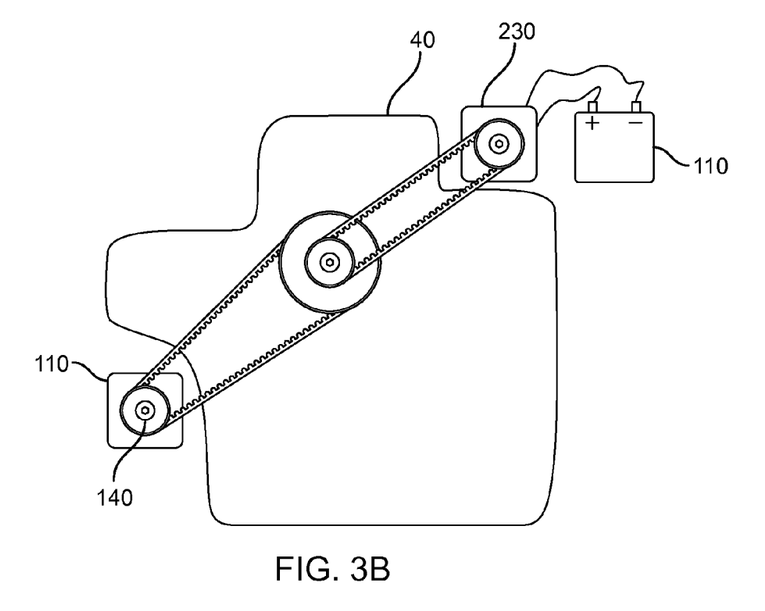
FIG. 3B is an elevational diagram of FIG. 3A.

In a third embodiment, the stock compressor 80 of the vehicle 20 is replaced with a variable displacement compressor-motor 220 (FIGS. 3A and 3B). The compressor-motor 220 has a motor portion 222 directly coupled to a compressor portion 228 within an enclosure 225, such that the motor portion may directly drive the compressor portion 228 regardless of the engine state. The compressor-motor 220 preferably has a low-volume displacement mode that presents less torque to the motor portion 222 than does a high-volume displacement mode for increased cooling capacity. The low-volume displacement mode is used to maintain the temperature of the air inside the vehicle 20 at an ambient air temperature, for example, and the high-volume displacement mode is used when occupants return to the vehicle 20 and desire more substantive cooling, for example.

In such a third embodiment, a stock generator 250 of the vehicle 20 is coupled to the engine 40 and adapted to convert rotational kinetic energy transferred from the engine 40 into electrical energy for recharging of the stock battery 260 and the rechargeable battery 110. The rechargeable battery 110 is electrically connected to the compressor-motor 220 for supplying power to the motor portion 222 thereof. The control circuit 120 is electrically connected with the compressor-motor 220 and adapted to activate the motor portion 222 when the engine 40 of the vehicle 20 is off and the air temperature inside the vehicle 20 exceeds the desired temperature range.

Figure 4A:
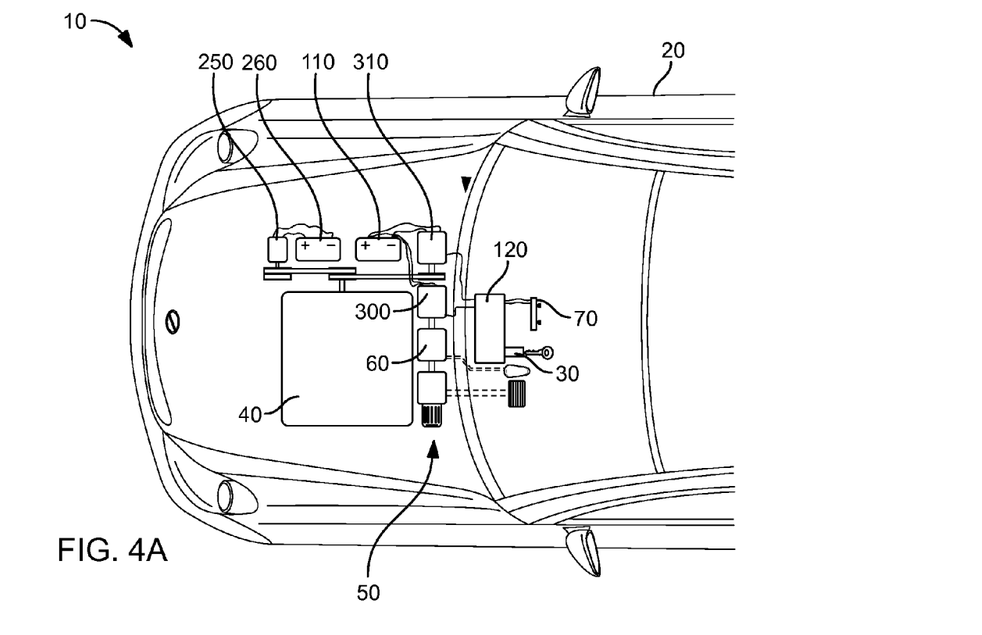
FIG. 4A is a top plan diagram of a fourth embodiment of a temperature regulation system.
Figure 4B:
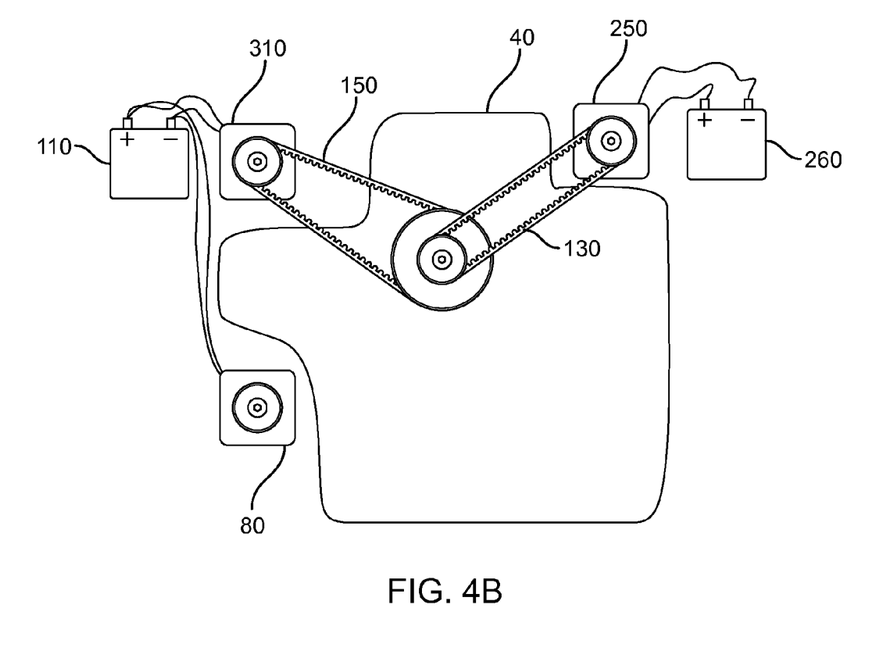
FIG. 4B is an elevational diagram of FIG. 4A.

In a fourth embodiment (FIGS. 4A and 4B), a combined compressor-motor 300 replaces the existing stock compressor 80. The rechargeable battery 110 powers the compressor-motor 300 regardless of the state of the engine 40, based on demand from the thermostat 70. A second motor-generator 310 coupled to the engine 40 is adapted to convert rotational kinetic energy transferred from the engine 40 into electrical energy to recharge the rechargeable battery 110. In this embodiment, the second motor-generator 310 is never used as a motor, but only as a generator, and as such any suitable generator could be interchanged with the second motor-generator 310. The control circuit 120 is electrically connected with the compressor-motor 220 and adapted to activate the motor portion 222 when the engine 40 of the vehicle 20 is off and the air temperature inside the vehicle 20 exceeds the desired temperature range.

In one embodiment similar to the fourth embodiment (not shown), the stock generator 250 and stock rechargeable battery 260 may be used to power the compressor-motor 300, provided the stock rechargeable battery 260 is of sufficient capacity to power the compressor-motor 310, and provided the control circuit 120 ceases operation of the compressor-motor 300 before the rechargeable battery 260 reaches a charge level insufficient to start the vehicle 20, or some other predetermined charge level.

Figure 5:
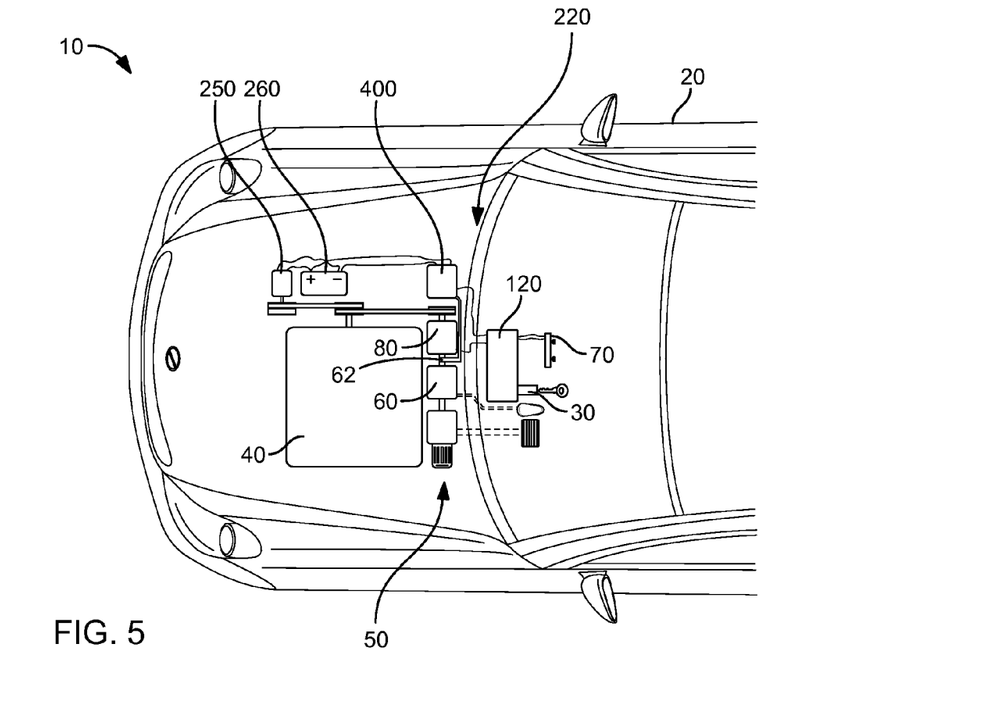
FIG. 5 is a top plan diagram of a fifth embodiment.

In one embodiment (FIG. 5), a combination motor-compressor 400 is used in conjunction with the stock compressor 80. The motor-compressor 400 is driven by the stock battery 260 electrically, and a T-fitting 62 fluidly connects the heat exchanger 60 to both the stock compressor 80 and the motor-compressor 400. As such, the motor-compressor 400 may be used to run the air moving system 50 when the engine 40 is off. Such a motor-compressor 400 may have a 5,000 BTU/hr capacity, for example, and may be fixed within the vehicle 20 where space allows. When the engine 40 is off, the motor-compressor 400 and all of the other components of the air moving system 50 operate off of the electrical power in the battery 260, which may be upgraded to a higher capacity as necessary.

Figure 6:
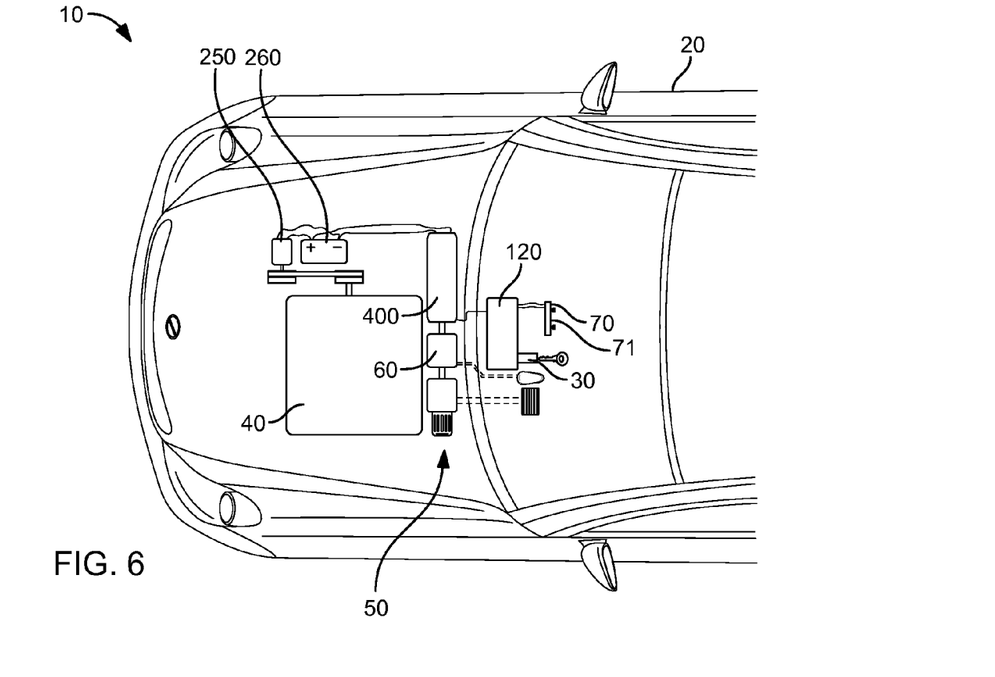
FIG. 6 is a top plan diagram of a sixth embodiment.

Alternately, FIG. 6 shows another embodiment wherein the stock compressor 80 is replaced by the battery-driven motor-compressor 400, which has a larger 25,000 BTU/hr capacity, for example. The stock generator 250 or alternator recharges the stock battery 260 while the engine 40 is on, and when the engine 40 is off the battery 260 drives the motor-compressor 400. The existing thermostat 70 controls the air moving system 50 when the engine 40 is on, and another thermostat 71, set at a higher cooling threshold temperature, runs the air moving system 50, preferably at a slower speed, when the engine 40 is off. The function of the other thermostat 71 may be incorporated into the thermostat 70, as a dual thermostat (not shown).

In one embodiment (not shown), the air moving system 50 may be activated while the engine 40 is off by calling a dedicated phone number associated with the vehicle 20, which provides the caller with the option, after entering a password, of activating the air moving system 50. In this way, the vehicle 20 may be cooled prior to the occupant entering the vehicle 20, but does not require that the air moving system 50 be active the entire time that the user is not in the vehicle 20, thereby conserving battery power.

While a particular from of the invention has been illustrated and described, it will be apparent that various modifications can be made without departing from the spirit and scope of the invention. For example, for clarity of illustration the figure diagrams show fewer belt-driven components than might be included and driven by the engine 40. Accordingly, it is not intended that the invention be limited, except as by the appended claims.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in its implementation details, while still being encompassed by the invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise from disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim form, the inventor contemplates the various aspects of the invention in any number of claim forms. Accordingly, the inventor reserves the right to add additional claims after filing the application to pursue such additional claim form for other aspects of the invention.

What is claimed is:

1. A temperature regulation system for a vehicle having an ignition system, an engine, and an air moving system that circulates air inside of the vehicle across a heat exchanger to maintain a desired temperature range within the vehicle with a thermostat, the air moving system including a compressor for compressing a gas for cooling a portion of the heat exchanger, the system comprising:
- a motor-generator for converting between rotational kinetic and electrical energy and having a motor mode wherein electrical energy is converted into rotational kinetic energy and coupled to the compressor, and a generator mode wherein rotational kinetic energy from the engine is converted into electrical energy;
- a rechargeable battery electrically connected to the motor-generator for supplying power to the motor-generator when the motor-generator is in the motor mode, and for receiving electrical energy from the motor-generator when the motor-generator is in the generator mode; and
- a control circuit electrically connected with the motor-generator and adapted to activate the motor mode when the engine of the vehicle is off and the air temperature inside the vehicle exceeds the desired temperature range, the motor-generator otherwise being in the generator mode.

2. The temperature regulation system of claim 1 wherein the motor-generator, engine, and compressor are all mechanically coupled with a first belt and pulley system, and wherein the engine further includes an automatic clutch adapted for either disengaging the engine from the first belt and pulley system when the motor-generator is in the motor mode, or for engaging the engine and coupling the engine to the first belt and pulley system when the engine is on and the motor-generator is in the generator mode.

3. The temperature regulation system of claim 1 wherein the motor-generator, engine, and compressor are all mechanically coupled with a first belt and pulley system, and wherein the motor-generator is coupled to the compressor with a second belt and pulley system, such that when the engine is on and the motor-generator is in the generator mode, the engine drives the first belt and pulley system to drive the motor-generator and the compressor, and such that when the engine is off and the motor-generator is in the motor mode, the motor-generator drives the second belt and pulley system to drive the compressor, the motor-generator and compressor each including an automatic clutch to disengage from the first belt and pulley system when the motor-generator is in the motor mode, and for disengaging from the second belt and pulley system when the motor-generator is in the generator mode.

4. The temperature regulation system of claim 1 wherein the rechargeable battery includes at least one battery taken from the group consisting of: a lithium ion battery, a lithium-phosphate battery, and a lead-acid battery.

5. The temperature regulation system of claim 1 further including at least one photovoltaic cell for recharging the rechargeable battery when exposed to sunlight, the at least one photovoltaic cell being fixable to an outside surface of the vehicle.

6. The temperature regulation system of claim 1 wherein the rechargeable battery is adapted to electrically power the air moving system of the vehicle when the thermostat detects the temperature of the air inside the vehicle has exceeded the desired temperature range.

7. The temperature regulation system of claim 1 wherein the heat exchanger is adapted to heat the air when the temperature of the air in the vehicle drops below the desired temperature range, or to cool the air when the temperature of the air in the vehicle rises above the desired temperature range.

8. The temperature regulation system of claim 1 wherein when the vehicle includes at least one window, the system further includes at least one heat-reflecting window shield for reflecting heat away from the at least one window.

9. The temperature regulation system of claim 1 wherein the rechargeable battery is adapted to electrically power the air moving system of the vehicle when the ignition system is off, the air moving system replacing the air inside the vehicle with ambient air outside of the vehicle.

10. The temperature regulation system of claim 1 wherein the motor-generator includes aluminum trapezoidal bars as either stator windings or both stator and rotor windings.

* * * * *